Jan. 5, 1965 E. G. MELICH 3,164,285
INSULATED HOT PLATE ASSEMBLIES
Filed March 14, 1962 2 Sheets-Sheet 2
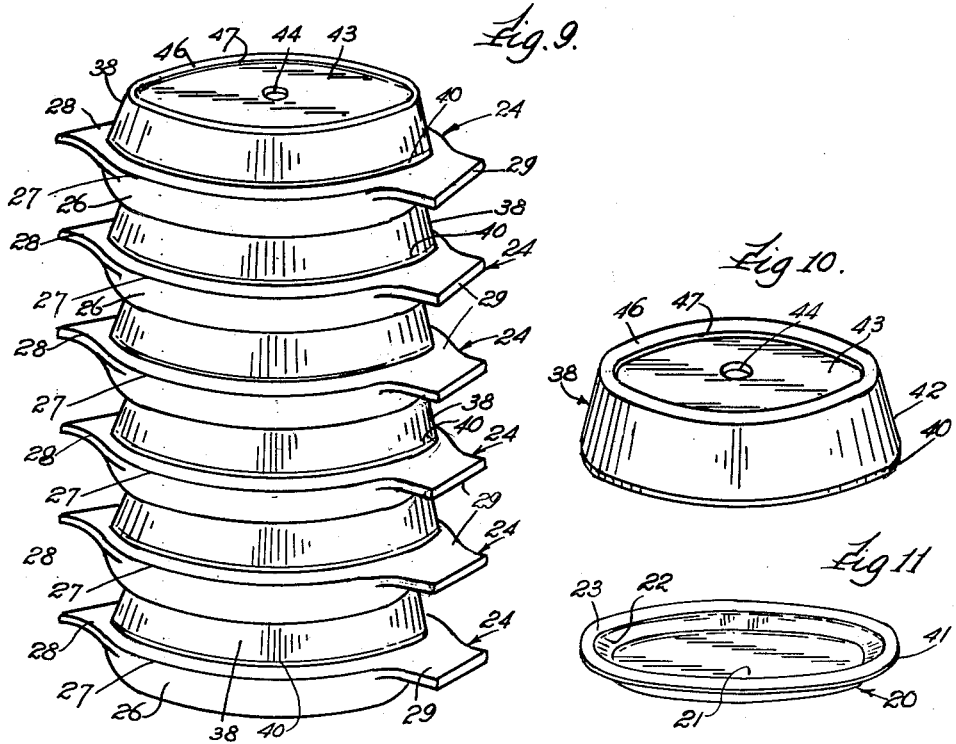
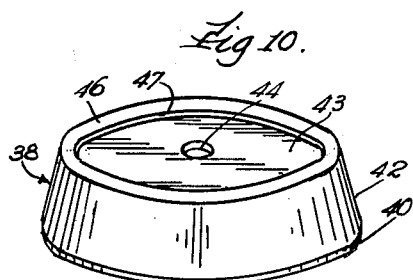
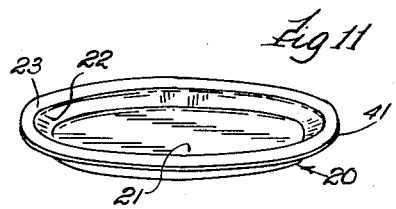
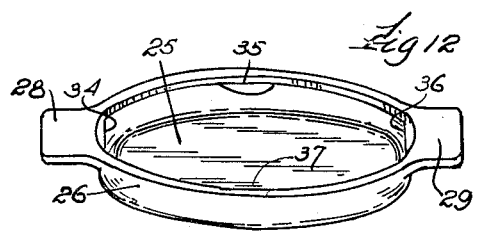
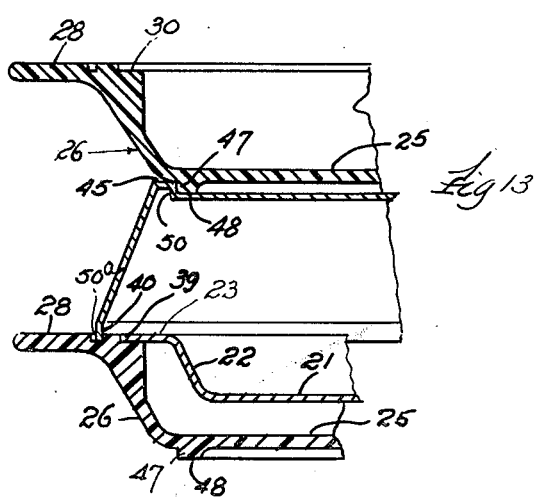
INVENTOR.
Edwin G. Melich
BY Robert H. Wendt
Attorney.

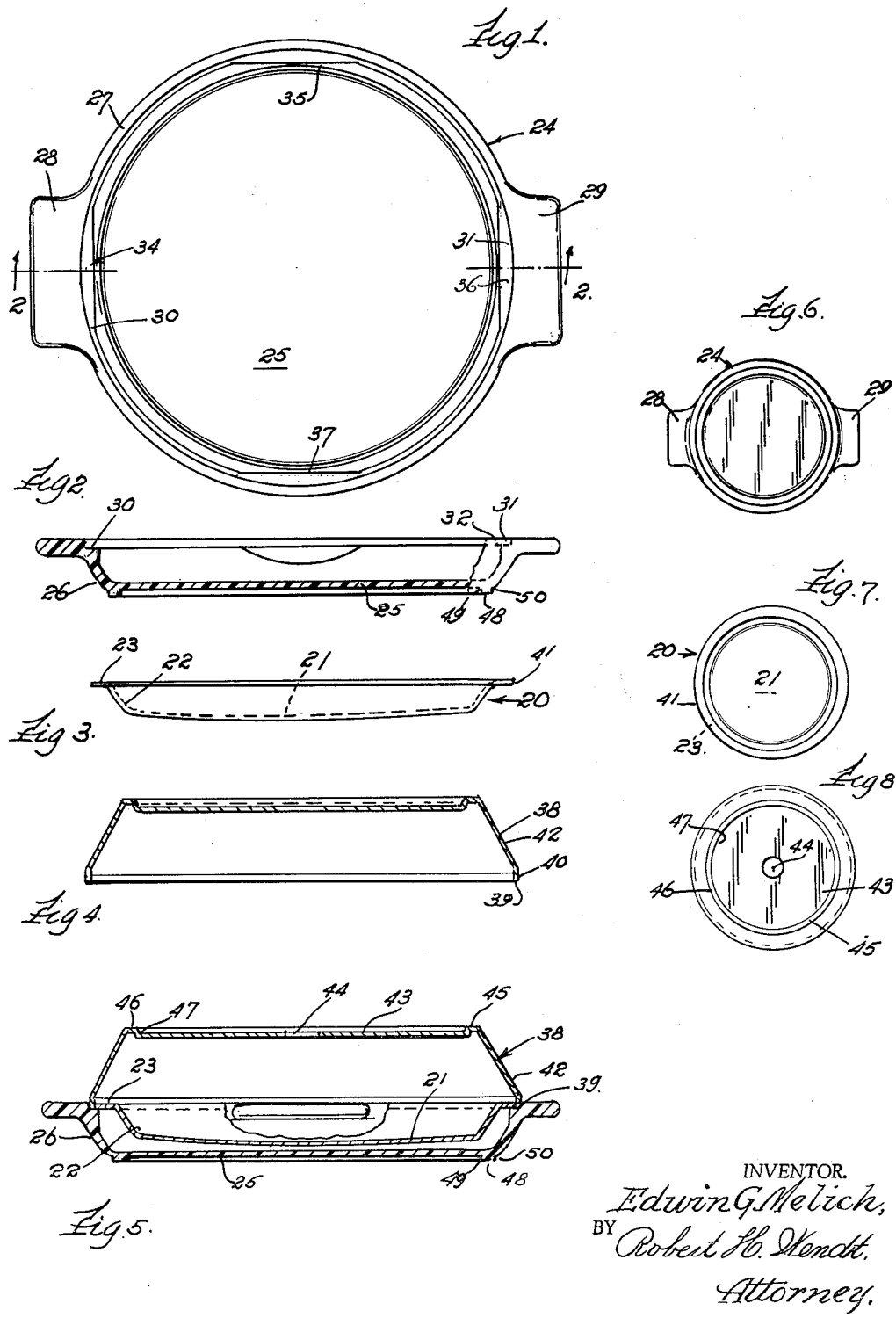

United States Patent Office 3,164,285
Patented Jan. 5, 1965

3,164,285
INSULATED HOT PLATE ASSEMBLIES
Edwin G. Melich, Chicago, Ill., assignor to Melco Foundry & Manufacturing Co., Chicago, Ill., a corporation of Illinois
Filed Mar. 14, 1962, Ser. No. 179,646
1 Claim. (Cl. 220—17)

The present invention relates to insulated hot plate assemblies, and is particularly concerned with hot plate assemblies in which a hot metal plate is adapted to be enclosed in an insulating plate holder and covered by means of a metal cover so constructed that the plate holder and cover may be stacked in such manner that the hot plate is insulated from contact with the persons who wish to transport the stack or distribute the loaded hot plates to the persons who are to consume the food.

One of the objects of the invention is the provision of improved insulated hot plate assemblies in which the plate itself may be heated and maintained at a high temperature and heat insulated from contact with anyone handling the insulated plate holder and also covered by means of a metal cover which is used to support similar hot plate assemblies in a stack so that many of these loaded hot plates may be transported and delivered in a stack, while maintaining the food and the hot plate at a suitable temperature.

Another object of the invention is the provision of improved insulating plate holders and improved covers for the plate holders by means of which the alignment of these component parts in a stack is assured and by means of which the heat is retained by the hot plate and food, and the labor of delivering and serving the food is reduced to a minimum.

Another object of the invention is the provision of improved supports and covers for hot plates which are adapted to be stacked and transported without possibility of one unit sliding off another, and which are adapted to reduce to a minimum the loss of heat from the food without requiring heated pellets.

Another object of the invention is the provision of improved insulated and covered hot plate assemblies which are simple in construction, adapted to be manufactured at a low cost, more efficient than the prior art in retaining heat, and adapted to be used to accomplish the results desired with a minimum amount of labor.

Other objects and advantages of the invention will be apparent from the following description and the accompanying drawings, in which similar characters of reference indicate similar parts throughout the several views.

Referring to the two sheets of drawings accompanying the specification,

FIG. 1 is a top plan view of one of the insulated plate holders embodying the invention;

FIG. 2 is a sectional view taken on the plane of the line 2—2 of FIG. 1, looking in the direction of the arrows;

FIG. 3 is a side elevational view of one of the hot plates used in the invention;

FIG. 4 is a diametrical sectional view taken through one of the metal covers embodying the invention;

FIG. 5 is a similar sectional view taken through the assembly of plate holder, plate, and cover;

FIG. 6 is a bottom plan view of the plate holder of FIG. 1;

FIG. 7 is a bottom plan view of the plate of FIG. 3;

FIG. 8 is a top plan view of the cover shown in FIG. 4;

FIG. 9 is a view in perspective of a stack of the hot plate assemblies shown in FIG. 5;

FIG. 10 is a view in perspective of the cover;

FIG. 11 is a view in perspective of the hot plate;

FIG. 12 is a view in perspective of the plate holder;

FIG. 13 is a fragmentary sectional view of a modification taken on the same plane as FIG. 5.

Referring to FIGS. 1–8, 20 indicates in its entirety one of the hot plates embodying the invention; and this comprises a stamped sheet metal plate preferably having a circular bottom 21, a tapered annular side wall 22 and a radially extending flange 23 which is also circular.

The plate 20 may be made of aluminum or aluminum having stainless steel bonded to its upper surfaces; but it is preferably made of metal having a high coefficient of heat conduction and having bright upper and lower surfaces, which tend to reflect heat and also to retain it, as distinguished from black surfaces, which tend to be perfect absorbers and perfect radiators.

The hot plate 20 may be used for cooking, broiling, or baking the food and also for serving it. The plate 20 may be supported and heat insulated by a plate holder, indicated in its entirety by the numeral 24. This plate holder is preferably constructed out of molded heat insulating powders or plastic to fit the plate 20, which it supports by means of a peripheral flange 23.

The plate holder 24 preferably has a plane bottom 25, a tapered side wall 26, and a radially extending top flange 27. The top flange may be provided with a pair of laterally projecting insulating handles 28, 29, forming an integral part of the plate holder and adapted to be used for lifting the plate holder and plate without burning the user when the plate is hot.

The top flange 27 of the plate holder is preferably provided with an annular recess 30, which is formed with a narrow side wall 31 and a narrow inwardly projecting surface 32 for supporting the plate 20 by means of the peripheral flange 23, which is received in the recess 30.

The plate holder 24 is deeper than the plate 20 so that the bottom 21 of the plate is spaced from the inside of the bottom 25 of the holder; and due to the width of the flange 23 on the plate the side wall 22 of the plate is spaced from the side wall 26 of the plate holder.

A dead air space 33 exists between the plate 20 and the plate holder 24, except where the flange 23 contacts the recess 30. The plate 20 is adapted to be supported on the surface 32 in the recess 30; but as such hot plates are sometimes subject to abuse and extreme heat, which may cause them to warp, the holder may also be provided with a plurality, such as three or four, inwardly projecting straight shelf formations 34, 35, 36, 37 projecting into the holder at the same level as the annular surface 32 which supports the plate.

The plate is adapted to be covered by means of a bright metal cover, indicated in its entirety by the numeral 38 (FIG. 4); and this cover may be made of stamped aluminum; and due to its bright condition it is also adapted to radiate a minimum amount of heat.

The cover 38 is preferably circular in shape; and its lower edge 39 is carried by a cylindrical wall portion 40 which fits about the edge 41 of the plate flange 23 and also fits inside the narrow wall 31 in the recess 30 in the top of the plate holder 24.

When the plate is mounted in the plate holder, there is an annular groove between the edge 41 of the plate and the cylindrical inner surface 31 in the recess 30; and the cover flange 40 fits in this groove, which holds it against lateral displacement.

The cover 38 has an upwardly extending frusto-conical side wall 42; and it has a plane cricular top wall 43, which is provided with a central aperture 44 of circular shape so that a finger may be inserted to lift the cover from the plate holder.

The cover 38 has an upwardly projecting stamped rib or ridge 45 of annular shape surrounding the plane part 43 of the cover top, thus depressing the plane portion 43 below the surface of the annular ridge 45.

The annular ridge 45 is formed by part of the side wall 42, by a flat upper portion 46, and by a downwardly extending circular portion 47 integrally joined to the top wall 43.

The plate holder 24 also has a downwardly projecting rib or ridge 48 (FIG. 2) which is annular in shape and is formed by the inner circular wall 49, the outer circular wall 50, and plane bottom edge 51 of the rib 48.

The outer surface of the bottom wall 25 is elevated above the bottom surface 51 of the rib 48; and the outer wall 50 of rib 48 is adapted to be received inside the ridge 45 on the cover. Thus whenever the plate holder and cover are assembled, another plate holder and cover may be stacked on it and others may be stacked on each other until a stack is formed, as shown in FIG. 9.

The component assemblies are held against lateral motion by the engagement of the ribs 48 on the plate holder inside the ribs 45 on the top of the cover; and the assembly may be transported and even tilted slightly without the component parts getting out of axial alignment.

The covers 38 may also be constructed of heat insulating plastic in some embodiments of the invention, thereby completely enclosing the hot plate in insulation above and below and reducing the loss of heat by providing a dead air space above and below the food and the metal plate.

The plastic cover may in some of the embodiments of the invention be made of transparent plastic, such as Lucite.

Referring to FIG. 13, this is a modification of the holder, plate, and cover combination in which the lower cylindrical edge 40 of the cover extends into an auxiliary annular groove 50a in the upper flange 27 of the insulating holder, which groove 50a is spaced outwardly from the recess 39, which receives the flange 23 of the plate. Thus the cover 38 may be insulated from the hot plate 20 in this embodiment of the invention.

In the simpler embodiments of the invention, in which the parts are made by stamping or molding, involving a clearance between the interengaging parts, which may be the result of providing the molds and dies with a draft clearance, the interengaging ridges and annular shoulders on the insulating holder and cover may be relatively loose; but by additional machine operations these parts may be given a relatively tighter frictional fit.

Such machine operations are permitted by the structure, since all the parts are circular and the plate holder, for example, may have a more pronounced depending rib 48 with a cylindrical annular shoulder at 50 engaging the inner cylindrical annular shoulder 47 on the cover. These parts may have frictional engagement, holding the stack of covers and plate holders against separation.

Similarly the cylindrical flange 40 on the covers may have a frictional fit in the groove 50a or against the annual shoulder 31 of the holder, also tending to hold the stack in assembled relation.

The frictional engagement between the bottom of the cover and the top of the insulating holder is such that a pull on the cover will disengage it, while the weight of the plate and its holder are sufficient to permit disengagement without lifting the holder by a pull on the cover.

In the same way the frictional engagement between the rib 48 on the holder and the annular shoulder 50 on the cover is such that an insulating holder may be lifted from a cover without displacing the cover from the assembly beneath it.

It will thus be observed that I have invented improved insulated hot plate assemblies which are adapted to maintain an elevated temperature in a hot plate and the food carried by it for an extended period of time by enclosing the food above and below in a dead air space without the necessity for also enclosing heated slugs of metal to maintain this temperature.

The present assemblies may be stacked and are held in axial alignment with each other so that they may be transported to the place where the food is to be served without the components of the stack sliding off each other.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

An insulated hot plate assembly, comprising a molded insulated plate holder formed out of plastic and provided with a flat circular bottom and an upwardly and outwardly sloping side wall on its outside and with a generally cylindrical chamber on its inside, said side wall having a thickened radial upper wall portion, provided on said radial wall portion with a pair of oppositely extending handle flanges, said handle flanges comprising rectangular portions for handling the hot plate assembly, said insulating plate holder having, adjacent the outer edge of said circular bottom, a downwardly projecting annular rib, having a lower plane surface and an outer cylindrical anchoring surface, said upper radial wall portion having an annular rectangular upwardly open groove having inner and outer cylindrical groove surfaces, and said radial wall portion having a depressed circular recess, spaced from said groove and being open upwardly and open into said cylindrical chamber for receiving the outer radial upper edge of a hot plate, a bright polished metal hot plate of light colored metal comprising a good reflector and a poor radiator, and having an upper circular flange fitting in said depressed circular recess, said hot plate having a depending side wall spaced from the insulating plate holder, and said depending wall carrying a circular bottom wall spaced from the bottom of said insulating holder, and a sheet metal cover member, said cover having a frusto conical side wall terminating at its lower edge in a narrow cylindrical wall portion, fitting in said rectangular upwardly open groove and having frictional engagement with one of the cylindrical surfaces of said open groove to hold the cover against unintentional separation of the cover and the insulating holder, the said cover having an upper plane central wall provided with a hole for an insertion to pull the cover off the holder, said upper central wall of said cover being surrounded by an upwardly extending annular pressed rib having an inner cylindrical wall fitting frictionally against the outer cylindrical surface on said downwardly projecting rib on said insulating holder to anchor the cover to the insulating holder which is above the cover.

References Cited in the file of this patent

UNITED STATES PATENTS

| | | |
|---|---|---|
| 1,745,935 | Kirmser | Feb. 4, 1930 |
| 1,948,778 | Zoia | Feb. 27, 1934 |
| 2,240,602 | Bartsch | May 6, 1941 |
| 2,332,173 | Shaffer | Oct. 19, 1943 |
| 2,545,528 | Murray | Mar. 20, 1951 |
| 2,938,645 | McCowan | May 31, 1960 |

FOREIGN PATENTS

| | | |
|---|---|---|
| 206,350 | Austria | Nov. 25, 1959 |
| 586,110 | Canada | Nov. 3, 1959 |
| 836,063 | Great Britain | June 1, 1960 |